Oct. 28, 1969     J. P. DES ORMEAUX     3,474,554
DAIRY PRODUCT ORDERING DEVICE
Filed July 10, 1967
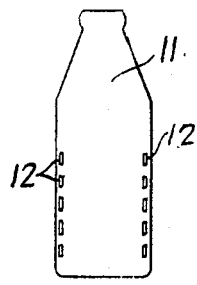
FIG. 1
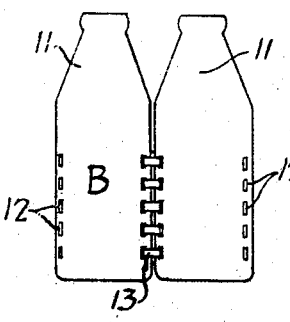
FIG. 2
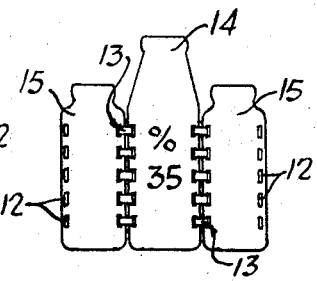
FIG. 3
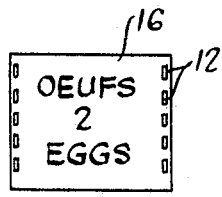
FIG. 4
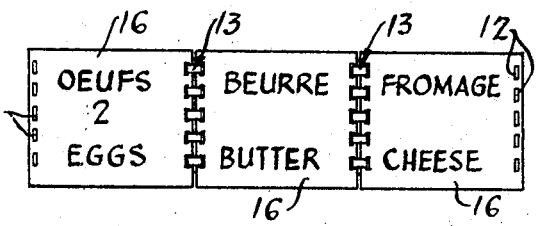
FIG. 5
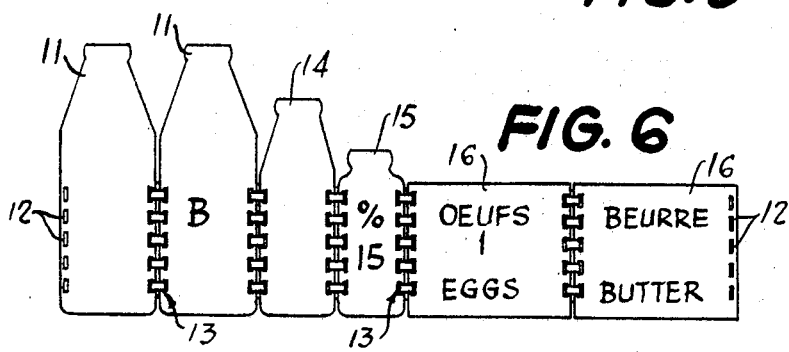
FIG. 6
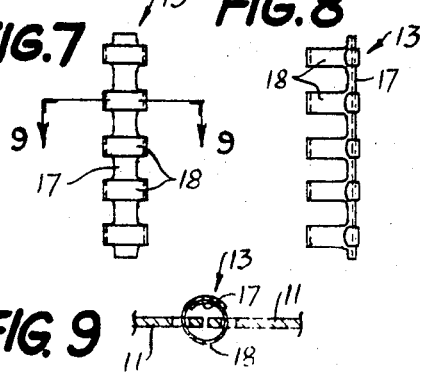
FIG. 7    FIG. 8    FIG. 10
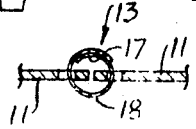
FIG. 9
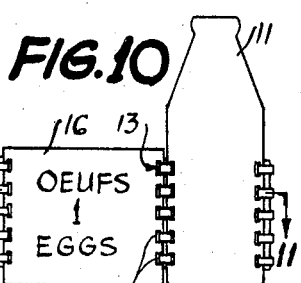
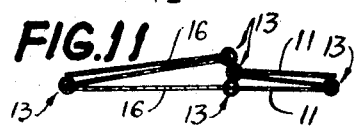
FIG. 11
INVENTOR
Jean P. Des Ormeaux
ATTORNEYS

United States Patent Office 3,474,554
Patented Oct. 28, 1969

3,474,554
DAIRY PRODUCT ORDERING DEVICE
Jean P. Des Ormeaux, 56 5th Ave.,
Verdun, Quebec, Canada
Filed July 10, 1967, Ser. No. 652,136
Int. Cl. G09f *3/02, 11/06, 19/00*
U.S. Cl. 40—5
2 Claims

ABSTRACT OF THE DISCLOSURE

A series of flat silhouettes of various forms of dairy products, releasably pivotally connected together along adjacent vertical edges to permit the silhouette forms to be folded upon each other or be stood together vertically to form a display of the number and types of the dairy products being ordered.

---

This invention relates to a dairy products ordering device and has particular reference to a device which can be placed in a house window supported by a curtain or venetian blind, etc., or placed behind a glass door, to indicate to a milk and dairy products delivery man the exact requirements of the household.

In conventional practice a householder will place a paper note in the neck of an empty milk bottle to indicate the dairy products required, i.e., milk, cream, butter, eggs, etc. Thus the delivery man is required to leave his milk delivery van and walk to the house, determine the daily products required, walk back to the van to obtain the products, return to the house with the products and then walk back to the van. This obviously constitutes a considerable waste of the delivery man's time and energy. Also, the notes placed in the bottles, and usually exposed to the elements, are often rain soaked and difficult for the delivery man to decipher, or blown away by winds, or disturbed and lost by dogs, etc. In an effort to combat the effects of the elements, and to ensure that notes are not lost due to wind or other disturbing factors, numerous devices have been tried which mainly comprise indicators for direct attachment to the neck portions of milk bottles. These indicators are usually made of carboard, or plastic sheet material, and comprise flag type indicators having a plurality of flags representing different dairy products and include a means to select specific flags indicating the products required. Other indicators include dairy products lists, also for direct attachment to milk bottles, and embodying a series of tabs or other means attached thereto which can be selected to indicate the dairy products required.

The above mentioned prior art indicators usually indicate the type of dairy product required, but become very complex when it is also desired to indicate the quantity of each type required. Another disadvantage is that these indicators, being directly attached to milk bottles, suffer from many of the disadvantages associated with the writing of paper notes, i.e., exposure to the elements and the possibility of being lost due to animal disturbance, etc. These indicators are not large enough for the information contained thereon to be read by a delivery man form his van and thus he must again walk to the house to determine the needs. Also, the very fact that these indicators are attached to milk bottles means that they will be placed on a door step or other low position, which is necessarily vulnerable to damage and makes reading the information thereon, from any distance, practically impossible.

The main object of these present invention is to provide an improved dairy products ordering device, which can be easily seen by a delivery man from the position of his delivery van and which will indicate to the delivery man, from this distant position, both the type and quantity of the dairy products required.

Another object is to provide an improved dairy products ordering device which is not attached to a milk bottle and which can be placed behind a window or glass door, and thus be out of the elements, whilst being easily visible from outside.

A further object is to provide a dairy products ordering device embodying the aforementioned objectives, whilst being economical to produce and readily adaptable to add new dairy products thereto, or to delete dairy products therefrom.

These and other objects and advantages of this invention will be further apparent by reference to the following specification and figures in which:

FIG. 1 is a front view of a single milk bottle silhouette.

FIG. 2 is a front view of a plurality of connected milk bottle silhouettes.

FIG. 3 is a front view of a plurality of milk bottle silhouettes but of a smaller size than those shown in FIGS. 1 and 2.

FIG. 4 is a front view of a rectangular card indicating a dairy product.

FIG. 5 is a front view of a plurality of rectangular cards indicating a variety of dairy products.

FIG. 6 is a front view of a combination of milk bottle silhouettes and rectangular product cards, connected together and ready for placement in a window.

FIG. 7 is a front view, to an enlarged scale, of a typical binder clip connector.

FIG. 8 is a side view of the clip shown in FIG 7.

FIG. 9 is a section on 9—9 of FIG. 7.

FIG. 10 is a front view of a plurality of bottle silhouettes and rectangular products cards, but folded, one upon the other, to represent a single bottle silhouette and a single product card silhouette.

FIG. 11 is a plan view of the bottle silhouettes and product cards shown in FIG. 10.

Referring now to the figures, FIG. 1 shows a front view of a milk bottle silhouette 11 which may be made of cardboard, plastic sheet, or any suitable material. Perforations 12 along each vertical edge of bottle silhouette 11 are suitably spaced to suit a conventional binder clip connector, such as the clip 13 detailed in FIGS. 7, 8 and 9 and described later in the specification. The milk bottle silhouettes are dimensioned to approximate full size bottles. For example, bottle silhouettes 11 in FIGS. 1 and 2 may represent quart bottles and in FIG. 3 bottle silhouettes 14 may represent pint bottles and bottle silhouettes 15 may represent half pint bottles.

The silhouettes may be coloured, white or brown to represent plain milk or chocolate milk, respectively, or other colours to represent other variations, as desired. The addition of 15% or 35%, to the white silhouettes, will represent table cream or whipping cream, respectively.

In FIG. 2 the letter B on bottle silhouette 11 indicates buttermilk, or in French the letters LB will indicate lait de beurre.

FIG. 4 shows a front view of a rectangular card 16, which may be made of cardboard, plastic sheet material, or other suitable material. Rectangular card 16 indicates a particular dairy product, which in the instance shown is eggs or, in French, oeufs. The cards may be marked to indicate a particular quantity required or each card may represent a particular quantity, e.g., one dozen, and thus if more than one dozen eggs is required then the appropriate number of cards 16 will be connected together by clip 13.

FIG. 5 shows a plurality of cards 16 connected together and indicating, in English and French, further dairy products. It will be realized that different products may be represented by cards in different colours, thus enabling the delivery man to recognize the product requirements from long distances.

FIG. 6 shows a front view of a typical dairy order as placed in a window behind a curtain or venetian blind for support, or any other emplacement offering convenient viewing and effective support. In FIG. 6 the order represents one quart plain milk, one quart buttermilk, one pint plain milk, a half pint of table cream, one dozen eggs, and a predetermined quantity of butter, for extmple, one pound.

FIGS. 7, 8 and 9 show details of a typical binder clip 13 which may be made of plastic or other suitable material. Clip 13 comprises back portion 17 having arm portions which are formed into overlapping binder rings 18. Thus, silhouettes may be rapidly assembled together by sliding rings 18 through perforations 12 in the required silhouettes, and also equally rapidly dismantled by reversing the assembly procedure. Part sections of bottle silhouettes 11 are included in FIG. 9, for illustration purposes.

It will, of course, be understood that the form of binder clip and matching perforations disclosed herein, are but one means for pivotally connecting the silhouettes, and that other means could equally well be used, such as wire coil type connectors, individual connections, or tabs and matching slots, etc.

It will also be understood that a plurality of bottle silhouettes 11, 14 and 15, and cards 16 may be assembled together and the required produce order indicated by folding the silhouettes, one upon the other, until the required produce order is indicated.

FIG. 10 shows a front view of a plurality of silhouettes assembled together and folded, one upon the other, until only a bottle silhouette 11 and a card 16 remain on view to indicate the required produce order.

FIG. 11 is a section on 11—11 in FIG. 10 and shows the folded silhouettes. The silhouettes may be very conveniently used for the imprinting thereon of advertising matter for the dairy companies, etc.

The silhouettes are described as being approximately full size but it will be understood this is a matter of convenience and that the dairy companies may wish to produce silhouettes larger or smaller than full size, and also in shapes and colours to suit their particular requirements or dairy produce shapes.

The basic concept of this invention may also be used to provide miniature silhouettes for attachment to mail boxes, etc., in apartment houses.

From the foregoing it is thus seen that a dairy produce ordering device, according to this invention, achieves all the objects and advantages as set forth herein.

What I claim is:

1. A dairy products ordering device comprising a plurality of indicators in sheet form and shaped to correspond with the silhouettes of the dairy products being ordered, each of said indicators having their lower edge disposed in a common horizontal plane, releasable means pivotally connecting adjacent vertical edges of the said indicators to permit said indicators to be arranged in interchangeable display in open consecutive edge-to-edge relation, or folded one upon the other, the said plurality of pivoted together indicators adapted to stand vertically in display formation relative to each other.

2. A dairy products ordering device as set forth in claim 1 in which the said individual indicators are perforated along their vertical edges, and the said releasable means is a binder clip engaging in the perforations of adjacent indicators to hold the said indicators in pivotal edge-to-edge relation.

References Cited

UNITED STATES PATENTS

| 178,863 | 6/1876 | Levy | 273—152.4 |
| 705,833 | 7/1902 | Gee | 35—32 X |
| 2,776,638 | 1/1957 | Whitaker | 40—65 X |

FOREIGN PATENTS

| 517,941 | 2/1940 | Great Britain. |

EUGENE R. CAPOZIO, Primary Examiner

W. J. CONTRERAS, Assistant Examiner

U.S. Cl. X.R.

40—102, 126